United States Patent [19]

Namba et al.

[11] Patent Number: 4,764,571
[45] Date of Patent: Aug. 16, 1988

[54] EPOXY RESINS FROM DICYCLOPENTADIENE-PHENOL ADDUCTS AND A METHOD OF PREPARING THE SAME

[75] Inventors: Hiroaki Namba; Minoru Hishinuma, both of Iwakuni, Japan

[73] Assignee: Sanyo-Kokusaku Pulp Company Limited, Tokyo, Japan

[21] Appl. No.: 9,262

[22] Filed: Jan. 30, 1987

Related U.S. Application Data

[63] Continuation-in-part of Ser. No. 767,434, Aug. 20, 1985, abandoned.

[30] Foreign Application Priority Data

Nov. 20, 1984 [JP] Japan ................. 59-245795

[51] Int. Cl.$^4$ ............................................. C08G 59/06
[52] U.S. Cl. .................................. 525/534; 525/523; 528/97; 528/103; 549/560
[58] Field of Search .............. 528/97, 103; 525/523, 525/534; 549/560

[56] References Cited

U.S. PATENT DOCUMENTS

| | | | |
|---|---|---|---|
| 3,419,624 | 12/1968 | Cotter et al. | 528/97 X |
| 3,536,734 | 10/1970 | Vegter et al. | 528/97 X |
| 3,944,523 | 3/1976 | Gobran | 525/534 |
| 4,390,680 | 6/1983 | Nelson | 528/101 X |
| 4,394,497 | 7/1983 | Nelson et al. | 528/97 X |

Primary Examiner—Earl Nielsen
Attorney, Agent, or Firm—Oblon, Fisher, Spivak, McClelland & Maier

[57] ABSTRACT

An epoxy resin having the formula:

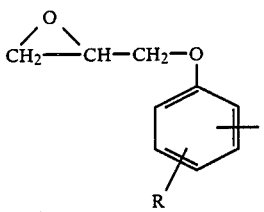

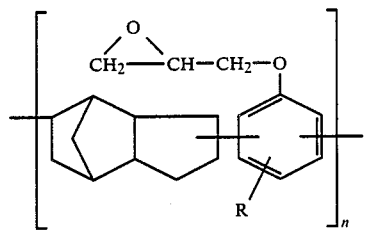

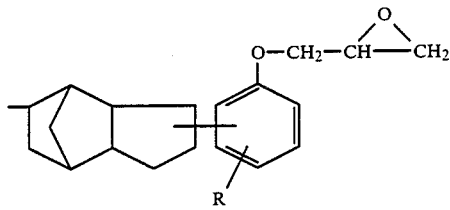

wherein R is a hydrogen atom or a methyl group, and n is an integer of from 0 to 15, and wherein said resin has an epoxy equivalent in the range of 260–345 g/eq.

9 Claims, 4 Drawing Sheets

EPOXY RESINS FROM DICYCLOPENTADIENE-PHENOL ADDUCTS AND A METHOD OF PREPARING THE SAME

This application is a continuation-in-part (CIP) application of Ser. No. 767,434, filed on Aug. 20, 1985, and now abandoned.

BACKGROUND OF THE INVENTION

1. Field of the Invention

The present invention relates to an epoxy resin and a method of preparing the same.

2. Description of the Background

Epoxy resins are used widely in the electric and electronic fields, since they have excellent mechanical properties, electric properties, and thermal properties, as well as chemical resistance, and adhesiveness. Recently, along with an increase in the degree of integration of electronic parts, thinning of the layer and miniaturization, for example, are in great vogue. However, in the case of electronic parts sealed with resin, there are such problems as the occurrence of residual stress after curing of resin and, in the case of resins for printed wiring board, heat resistance and flexibility are required.

Thus, a need continues to exist for a resin having lowered residual stress and increased flexibility.

SUMMARY OF THE INVENTION

Accordingly, it is an object of the present invention to provide an epoxy resin having excellent low residual stress after resin curing.

It is also an object of this invention to provide an epoxy resin having excellent heat resistance and flexibility.

Further, it is also an object of this invention to provide a method for preparing the above-described epoxy resins.

According to the present invention, the foregoing and other objects are attained by providing an epoxy resin having the formula:

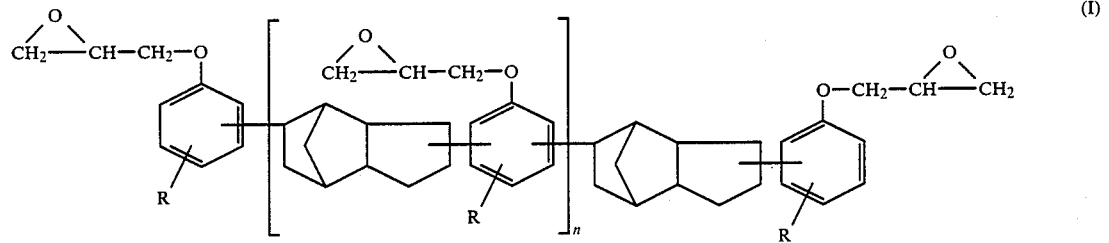
(I)

wherein R is a hydrogen atom or methyl group and n is an integer of 0 to 15.

DETAILED DESCRIPTION OF THE PREFERRED EMBODIMENTS

Figure 1:
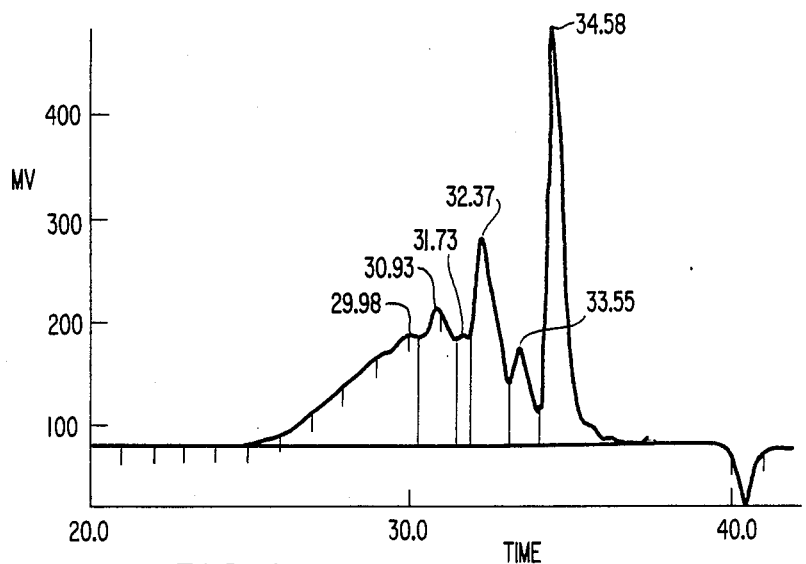
FIGS. 1 and 2 are gel permeation chromatograms of the compounds obtained in Examples 1 and 2, respectively.

In accordance with the present invention, epoxy resins having lowered residual stress and excellent flexibility are provided. However, at the same time, these epoxy resins retain the advantageous characteristics and properties of epoxy resins, generally.

In general, the present epoxy resins have the formula:

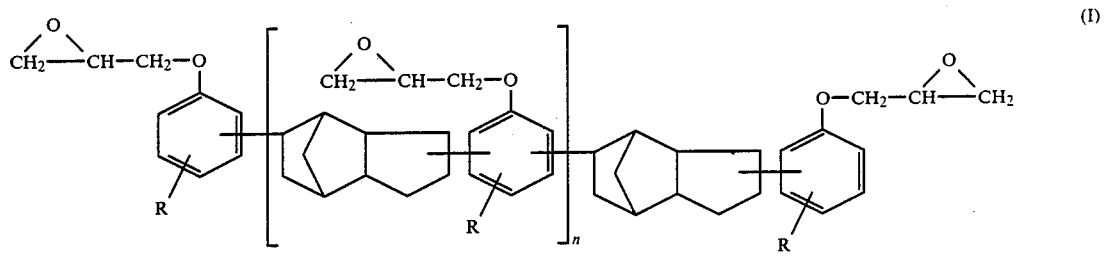
(I)

wherein R is a hydrogen atom or methyl group and n is an integer from 0 to 15.

The compounds of the present invention are generally prepared by polymerizing phenolic compounds with dicyclopentadiene, and then reacting the resin so produced with epichlorhydrin.

Thus, two epichlorohydrin processes are included in the manufacturing method of the invention. The first is a process to manufacture the resins through the polymerization of phenols with dicyclopentadiene using a catalyst and the second is a process to glycidylize the phenolic hydroxyl groups present in the polymerization product with epichlorhydrin.

As the phenols to be used in the first process, phenol, o-cresol, m-cresol, p-cresol, ethyl phenol, and isopropyl phenol, etc., can be mentioned.

For the catalysts in the first process, any catalyst can be used if it is a Lewis acid. As the Lewis acids, AlCl$_3$, BF$_3$, ZnCl$_2$, H$_2$SO$_4$, TiCl$_4$, for example, can be mentioned. They are used independently or as a mixture of more than two. After the phenols were allowed to melt by heating and the catalyst added thereto was dissolved uniformly, dicyclopentadiene is added dropwise at 50° to 180° C., preferably 80° to 150° C. Respective addition amounts are 0.001 to 0.1 mol, preferably 0.005 to 0.10 mol of the catalyst and 0.1 to 10.0 mol, preferably 0.3 to 4 mol of the phenols to 1 mol of dicyclopentadiene. In this process, the phenols may be added to a mixture of dicyclopentadiene and the catalyst. Also, the catalyst may be added gradually to a mixture of dicyclopentadiene and the phenols. The time for the addition is selected to be 1 to 10 hours depending upon the formulation of raw materials and thereafter, the reaction is continued for several hours. Following this, the unreacted monomer is distilled off by distillation under reduced pressure to obtain the resins represented by a general formula (II)

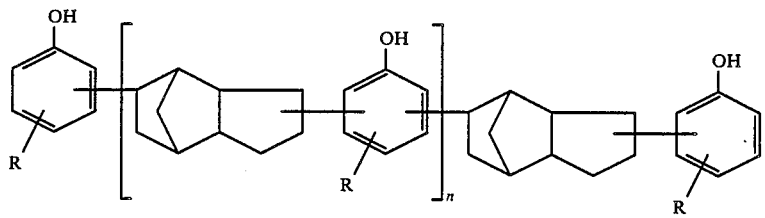

(II)

wherein, R indicates a methyl group or a hydrogen atom and n indicates an integer of 0 to 15.

In the polymerization reaction, solvents such as nitrobenzene, light oil, or carbon disulfide, for example, which are inert can also be added. In the second process, resin (II) obtained from the first process is dissolved into 1 to 20 times mol, preferably 2 to 10 times mol of epichlorohydrin to an amount equivalent to the phenolic hydroxyl groups of the resin. This reaction liquor is kept at 10° to 120° C., preferably 50° to 90° C. and subjected to the addition reaction in the presence of catalysts such as a quaternary ammonium salt, for example, to form $\alpha$-chlorohydrin derivative in which epichlorohydrin is attached to the phenolic hydroxyl groups. As the catalysts, quaternary ammonium salts such as tetramethyl ammonium bromide, benzyltriethyl ammonium bromide, tetraethyl ammonium chloride, etc., tertiary amines such as trimethylamine, halogenated phosphonium salts, alkali metal halides such as potassium bromide, sodium chloride, etc., and the like can be mentioned. They are used separately or in a mixed state. The amounts of the catalyst to be used are about 0.05 to 5.0 parts by weight to 100 parts by weight of resin [II]. Then, alkali is added successively to the reaction system while the system is kept under a reduced pressure of 40 to 300 mmHg, and water is distilled off by forming an azeotrope with epichlorohydrin. Here, by adjusting the addition rate of alkali and the distillation conditions, the water content in the reaction system is 0.1 to 5.0% by weight. Although it is possible to effect the above without removing water from the reaction system, this is disadvantageous for industrial practice because of the decomposition of epichlorohydrin with water in the system. Moreover this is not preferable because of the formation of by-products in large quantities. The amounts of alkali to be used are 0.85 to 1.00 equivalent to an amount equivalent to the phenolic hydroxyl groups of resin [11]. As alkalies, sodium hydroxide, potassium hydroxide, barium hydroxide, sodium carbonate, etc. can be mentioned, but sodium hydroxide and potassium hydroxide are preferable. The reaction temperature is 30° to 120° C., preferably 50° to 90° C. The reaction time is one needed substantially for the completion of the ring closure reaction (dehydrohalogenation) and ordinarily it is 0.5 to 10 hours, preferably 2 to 6 hours.

Following this, after removing excess epichlorohydrin by distillation under reduced pressure, the reaction product is dissolved into organic solvents such as methyl isobutyl ketone, methyl ethyl ketone, and toluene, for example, and the metal halide formed secondarily is filtered off. The filtrate is washed several times with purified water, and then the organic layer is condensed under reduced pressure to obtain the epoxy compound of the present invention.

The present invention will now be illustrated by certain Examples which are not intended to limit the present invention but only to illustrate the same. In all of the following Examples, "parts" refers to "parts by weight".

EXAMPLE 1

Into a reactor fitted with a thermometer, cooler, stirrer and dropping pipe were charged 1000 parts of p-cresol and the temperature was kept at 100°±5° C. while 15 parts of 47% BF$_3$-ether complex were added. Then, 416.9 parts of dicyclopentadiene were added dropwise over 4 hours. After the completion of addition, the temperature was kept at 100°±5° C. for 1 hour, and thereafter, the unreacted p-cresol and BF$_3$ were distilled off under the conditions of 150° C. and 4 mmHg to obtain 950 parts of polymer.

Following this, 100 parts of polymer obtained and 1 part of tetramethyl ammonium bromide were dissolved into 250 parts of epichlorohydrin and allowed to react for 10 hours at 80°±5° C. After the addition reaction was completed, a water separator was fitted, and 36 parts of 50% by weight aqueous solution of sodium hydroxide were added dropwise. During the addition, water was separated successively from the reaction system so that the water content in the system is then within a range of 0.1 to 2.0% by weight. After the completion of addition, the reaction was continued for 4 hours and then epichlorohydrin was distilled under reduced pressure. The reaction product remaining behind was dissolved into methyl isobutyl ketone, and sodium chloride present in the reaction system was filtered off. After the filtrate was washed further with purified water, the organic solvent was distilled off from the organic layer to obtain the desired epoxy resin.

EXAMPLE 2

A similar method to that of Example 1 was used except that 47% BF$_3$-ether complex used in Example 1 was replaced with 8.5 parts of anhydrous aluminum chloride. Thereby, the epoxy resin was obtained.

The physical properties of the compounds in Example 1 and 2 are shown in Table 1 and FIGS. 1-4.

TABLE 1

Figure 2:
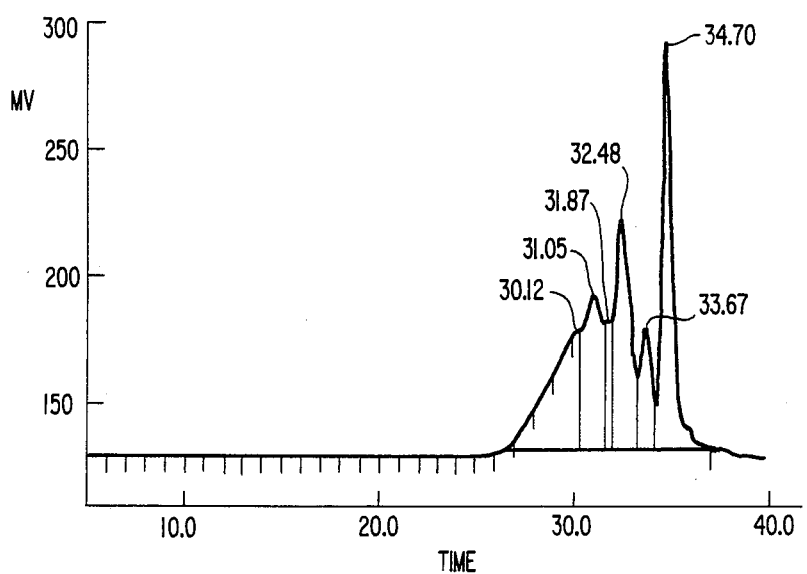
Figure 3:
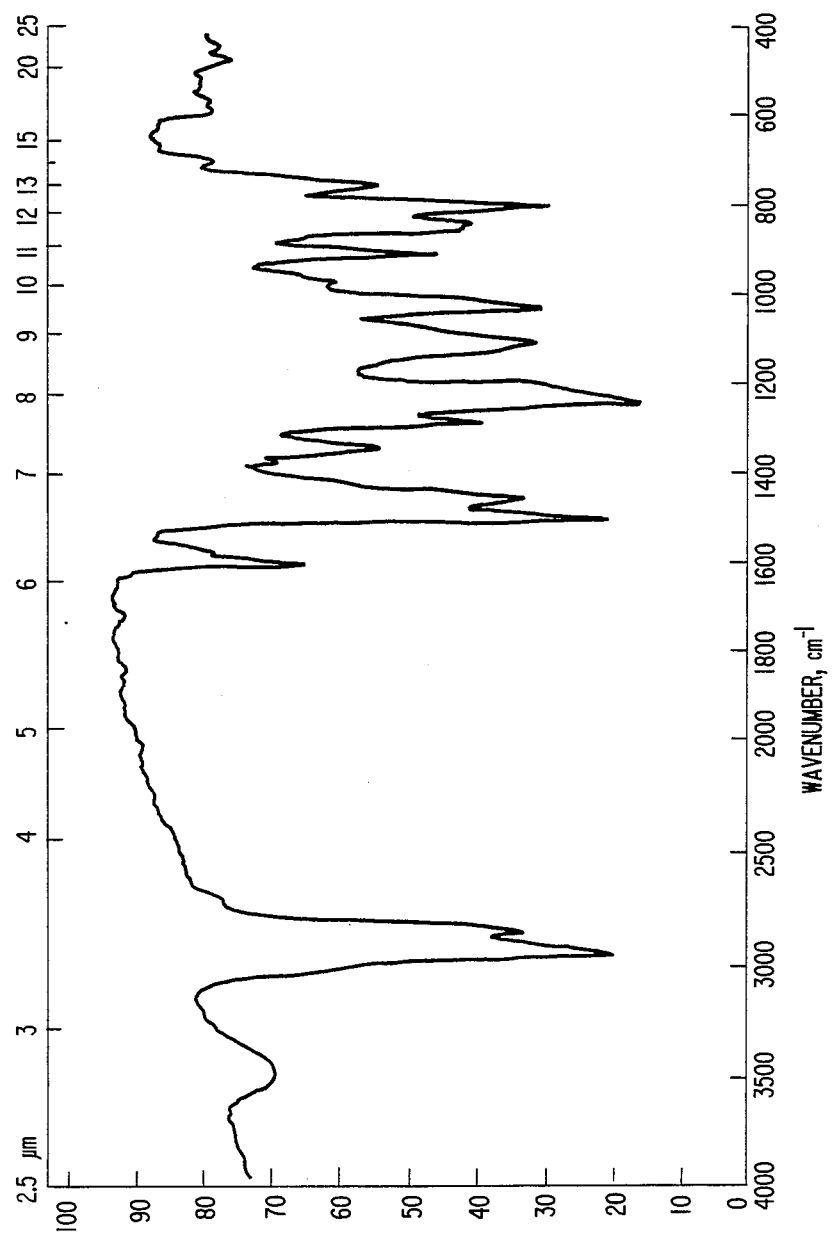
FIG. 3 is an infrared spectrum (KBr method) of the compound of the present invention.

| Example | Type of resin | Epoxy equivalent | Melting point | Hydrolytic chlorine | UV[1] spectrum | GPC[2] |
|---|---|---|---|---|---|---|
| 1 | p-Cresol dicyclopentadiene resin | 320 g/eq | 59–61° C. | 0.04% | 279.5 mm | FIG. 1 |
| 2 | p-Cresol dicyclopentadiene resin | 345 g/eq | 62–64° C. | 0.05% | 279.5 mm | FIG. 2 |

[1] Ultraviolet absorption spectrum: $\lambda_{max}$ in $CHCl_3$
[2] GPC: Gel permeation chromatography
Column: TSK-4000 HXL + 3000 HXL + 2000 HXL × 2

EXAMPLE 3

By employing the p-cresol dicyclopentadiene resin produced in Example 1 and as a base resin, and diamino-diphenylmethane (DDM) as a curing agent respectively, compositions were prepared as shown in Table 2. The compositions were melted and mixed at 120° C., and poured into molds. Thereafter, they were subjected to curing in successive three stages of 12 hours at 160° C., 1 hour at 200° C. and 1 hour at 240° C. The physical characteristics of the cured products were shown in Table 3, and the measured result of viscoelasticity thereof were shown in FIG. 4.

Figure 4:
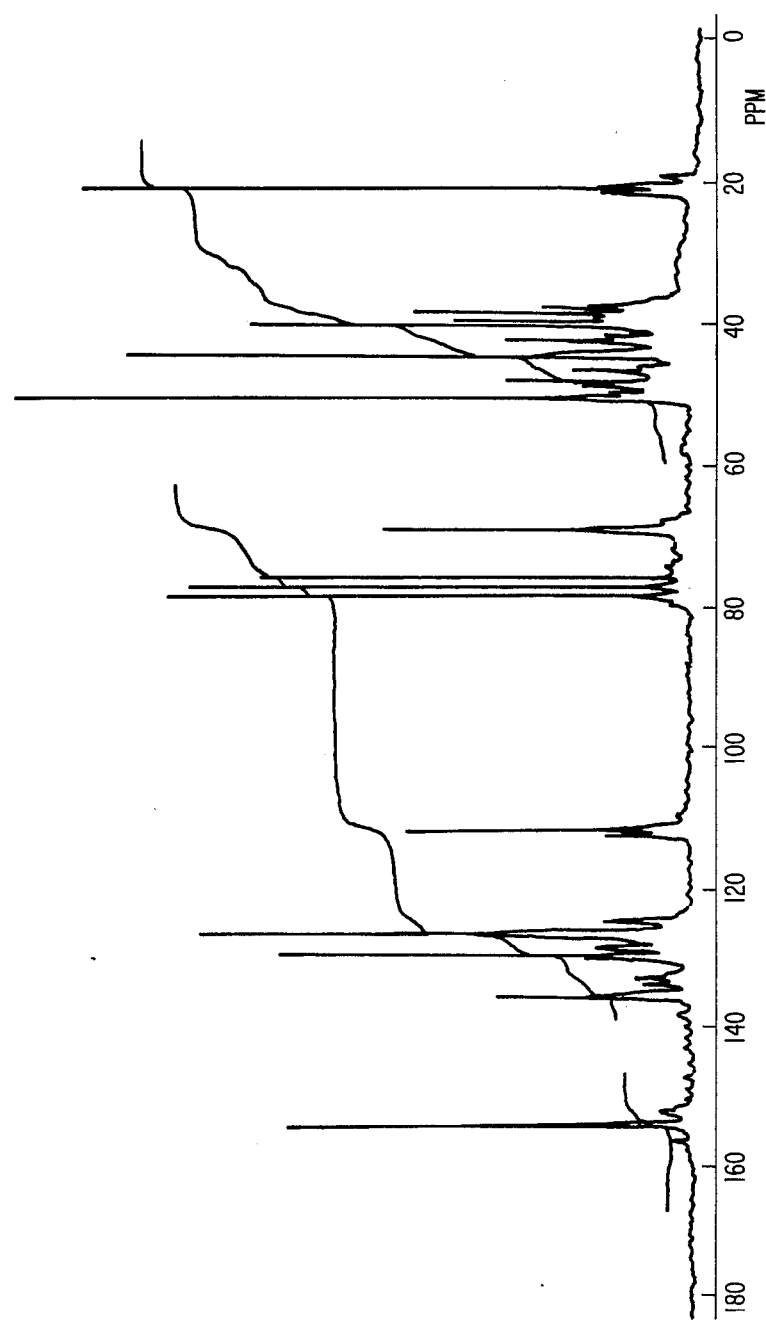
FIG. 4 is a nuclear magnetic resonance spectrum of the present compound.
Figure 5:
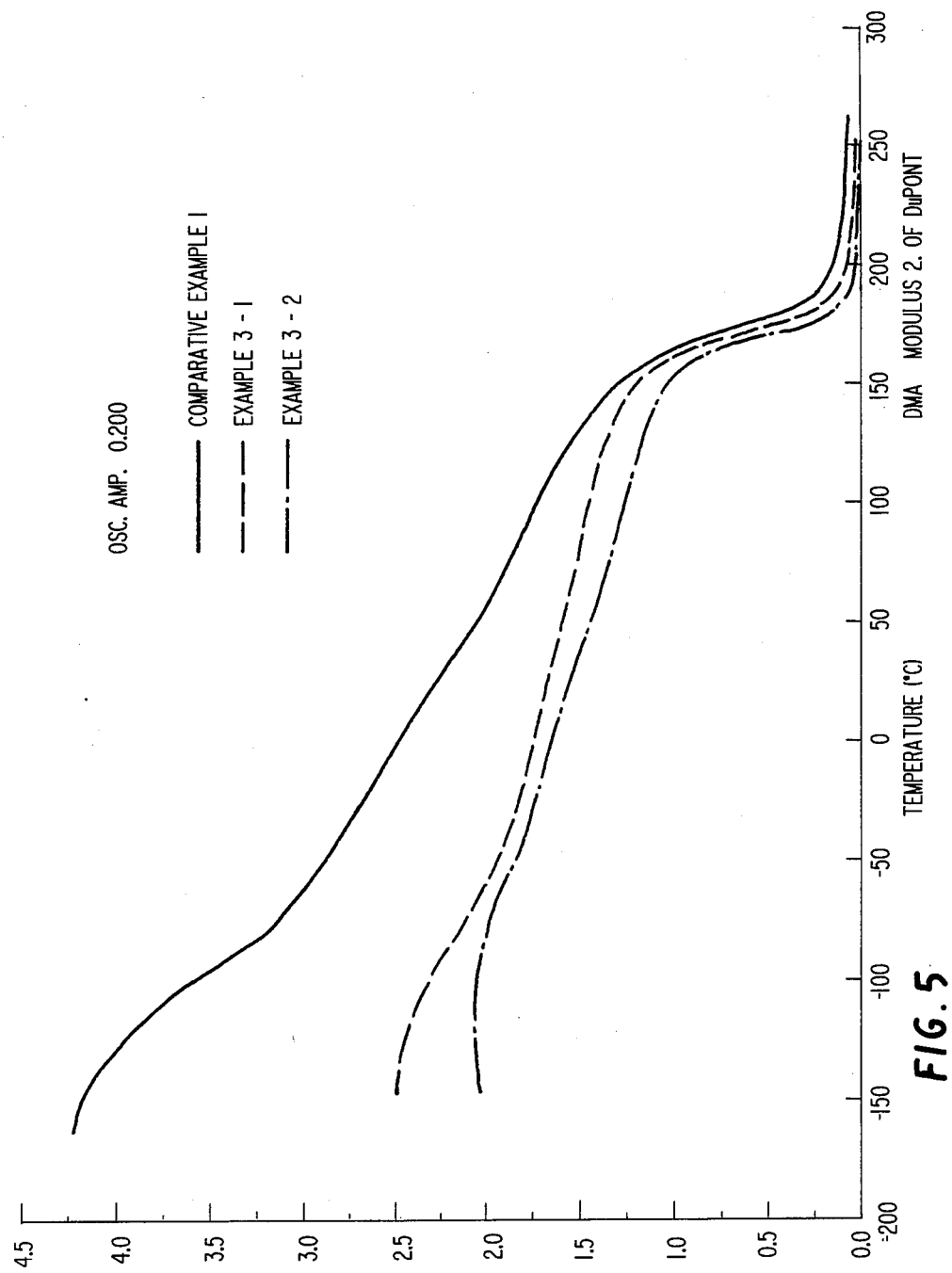
FIG. 5 illustrates the observed relationship between viscoelasticity and temperature for the resins of Example 3 and Comparative Example 1.

As obvious from Table 3 and FIG. 4, the elasticity when using p-cresol dicyclopentadiene resin is smaller than that when using ortho-cresol-novolak resin, while coefficients of linear expansion in both cases are almost equal each other, from which it becomes clear that internal stress in the former case can be lowered. Furthermore, in the former case (Example), the water-absorbing coefficient thereof is low and it is excellent in water-resisting property, and the electric resistance thereof is high, which demonstrates the formation of the cured product having excellent electric properties. In addition, the glass transition point and the temperature at which thermal loss amounts to 1% of weight in the former case are both higher than those in the latter case (comparative example), and the heat-resisting property in the former case is superior to that in the latter case.

COMPARATIVE EXAMPLE 1

According to the fomulation shown in Table 2, ortho-cresol-novolak resin (epoxy equivalent: 218 g/eq, average molecular weight Mw: 3860, melting point: 95° C.) and phenol-novolak (hydroxide group equivalent: 104, melting point 71° C.) were melted and mixed to give a resin, which was then cured likewise in Example 3. The cured product was subjected to measuring the physical properties and dynamic viscoelasticity, the results of which were shown in Table 3 and FIG. 4.

TABLE 2

|  | Example 3-1 | Example 3-2 | Comparative Example 1 |
|---|---|---|---|
| Resin by Example 1 | 100 | | |
| Resin by Example 2 | | 100 | |
| Orthocresol-novolak Resin | | | 100 |
| Diamino-diphenylmethane | 15.3 | 14.2 | 47.1 |
| Epoxy equivalent | 320 | 345 | 218 |

TABLE 3

|  | Example 3-1 | Example 3-2 | Comparative Example 1 |
|---|---|---|---|
| Glass transition Temperature (°C.) (Note 1) | 175 | 176 | 178 |
| Volume resistivity ($\Omega cm$) | $9.3 \times 10^{15}$ | $8.8 \times 10^{15}$ | $7.1 \times 10^{15}$ |
| Temperature of thermal loss by 1% in weight | 320 | 314 | 281 |
| Coefficient of linear expansion (°C.$^{-1}$) | $6.7_2 \times 10^{-5}$ | $6.8_1 \times 10^{-5}$ | $7.7_1 \times 10^{-5}$ |
| Water-absorbing coefficient (%) | 0.20 | 0.21 | 0.26 |
| Storage elastic modulus (G Pa) (Note 2) | 1.8 | 1.7 | 2.6 |
| Gelation time (Sec) | 65 | 70 | 180 |

Note 1: determined by measuring coefficient of linear expansion.
Note 2: measured value at 100° C.

EXAMPLE 4

The composition for preparing the cured resin products and the physical properties of the cured product are shown in Table 4. From this Table 4, it can be seen that when the epoxy equivalent is too low, such as below 260, the storage elastic modulus of the product is elevated and the resin becomes too hard, and the gelation time is prolonged inasmuch as the molecular weight becomes smaller. However, when the epoxy equivalent is too high, such as above 345, the resin elasticity is lowered; but the cross-linking density, heat-resistance and humidity-resistance are also lowered.

TABLE 4

|  | Epoxy equivalent | Example 4 | Comparative example 2 | Comparative example 3 | Comparative example 4 |
|---|---|---|---|---|---|
| P-Cresol dicyclopeutadiene resin | 243 | | 100 | | |
| P-Cresol dicyclopeutadiene resin | 280 | 100 | | | |
| P-Cresol dicyclopeutadiene resin | 380 | | | 100 | |
| P-Cresol dicyclopeutadiene resin | 420 | | | | 100 |
| Diamino-diphenyl-methane | | 17.5 | 20.2 | 12.9 | 11.7 |
| Glass Transition Temperature (°C.) | | 185 | 183 | 170 | 158 |
| Temperature of thermal loss by 1% in weight | | 325 | 315 | 273 | 260 |
| volume resistivity ($\Omega cm$) | | $8.7 \times 10^{15}$ | $8.7 \times 10^{15}$ | $5.0 \times 10^{15}$ | $3.2 \times 10^{15}$ |
| Coefficient of linear expansion (°C$^{-1}$) | | $6.62 \times 10^{-5}$ | $6.61 \times 10^{-5}$ | $8.20 \times 10^{-5}$ | $9.0 \times 10^{-5}$ |
| Water-absorbing coefficient (%) | | 0.19 | 0.20 | 0.23 | 0.24 |
| Storage elastic modules (G Pa) | | 1.9 | 2.8 | 1.6 | 1.4 |
| Gelation time (Sec) | | 62 | 90 | 232 | 240 |

Having now fully described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. An epoxy resin having the formula:

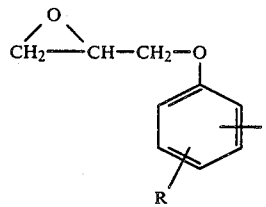

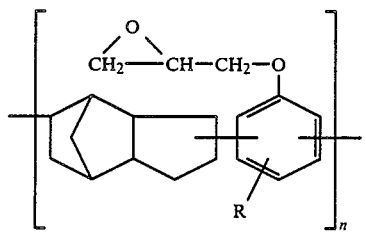

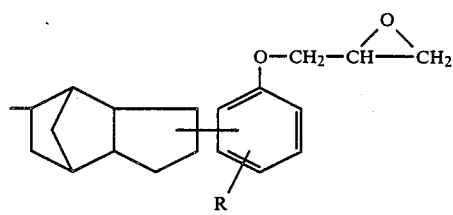

wherein R is a hydrogen atom or a methyl group, and n is an integer of from 0 to 15, and wherein said resin has an epoxy equivalent in the range of 260-345 g/eq.

2. The epoxy resin of claim 1, wherein said resin has an epoxy equivalent in the range of 280-345 g/eq.

3. The epoxy resin of claim 1, which is produced by reacting eipchlorohydrin with a resin obtained from the polymerization of a phenol with dicyclopentadiene.

4. The epoxy resin of claim 3, wherein said phenolic compound is selected from the group consisting of phenol, o-cresol, m-cresol, p-cresol, ethyl phenol and isopropyl phenol.

5. The epoxy resin of claim 3, wherein the reaction of said phenolic compound with dicyclopentadiene is in the presence of a catalyst.

6. The epoxy resin of claim 5, wherein said catalyst is a Lewis acid catalyst selected from the group consisting of $AlCl_3$, $BF_3$, $ZnCl_2$, $H_2SO_4$, $TiCl_4$ and $H_3PO_4$.

7. The epoxy resin of claim 5, wherein the phenol is first melted and said catalyst is added thereto, and then said dicyclopentadiene is added dropwise at a temperature of 50°-180° C. in the amount of 0.001-0.1 moles of catalyst, and 0.1-10.0 moles of said phenol to 1 mole of dicyclopentadiene.

8. The epoxy resin of claim 3, wherein the resin obtained from the polymerization of said phenol and dicyclopentadiene is dissolved into a 1-20 molar excess of epichlorohydrin at a temperature of 10-120° C. in the presence of a catalyst.

9. The epoxy resin of claim 8, wherein said catalyst is selected from the group consisting of tetramethyl ammonium bromide, benzyltriethyl ammonium bromide, tetraethyl ammonium chloride, trimethylamine, halogenated phosphonium salts, potassium bromide and sodium chloride; and is used in the amount of 0.05-5.0 parts by weight per 100 parts by weight of resin.

* * * * *